United States Patent [19]
Classe et al.

[11] 3,924,572
[45] Dec. 9, 1975

[54] ANIMAL CAGE

[75] Inventors: Anthony V. Classe, New York, N.Y.; Robert P. Mehn, Middletown, N.J.

[73] Assignee: IPCO Hospital Supply Corporation, Valhalla, N.Y.

[22] Filed: Nov. 21, 1973

[21] Appl. No.: 418,084

Related U.S. Application Data

[62] Division of Ser. No. 254,898, May 19, 1972, Pat. No. 3,826,229.

[52] U.S. Cl. .................................................. 119/17
[51] Int. Cl.² .......................................... A01K 1/00
[58] Field of Search ........................... 119/17, 18, 1

[56] References Cited
UNITED STATES PATENTS

| | | | |
|---|---|---|---|
| 2,988,044 | 6/1961 | Adelberg et al. ................. | 119/18 X |
| 3,122,127 | 2/1964 | Shechmeister et al. ............... | 119/18 |
| 3,212,474 | 10/1965 | Higgins et al. ......................... | 119/18 |
| 3,377,990 | 4/1968 | Mitchell .................................. | 119/1 |
| 3,381,663 | 5/1968 | Dayton ............................ | 119/17 X |

*Primary Examiner*—Hugh R. Chamblee
*Attorney, Agent, or Firm*—Holland, Armstrong, Wilkie & Previto

[57] ABSTRACT

An animal cage in which bedding material is in the cage and a seal is provided to prevent the bedding material from spilling out during shipment and storage.

7 Claims, 9 Drawing Figures

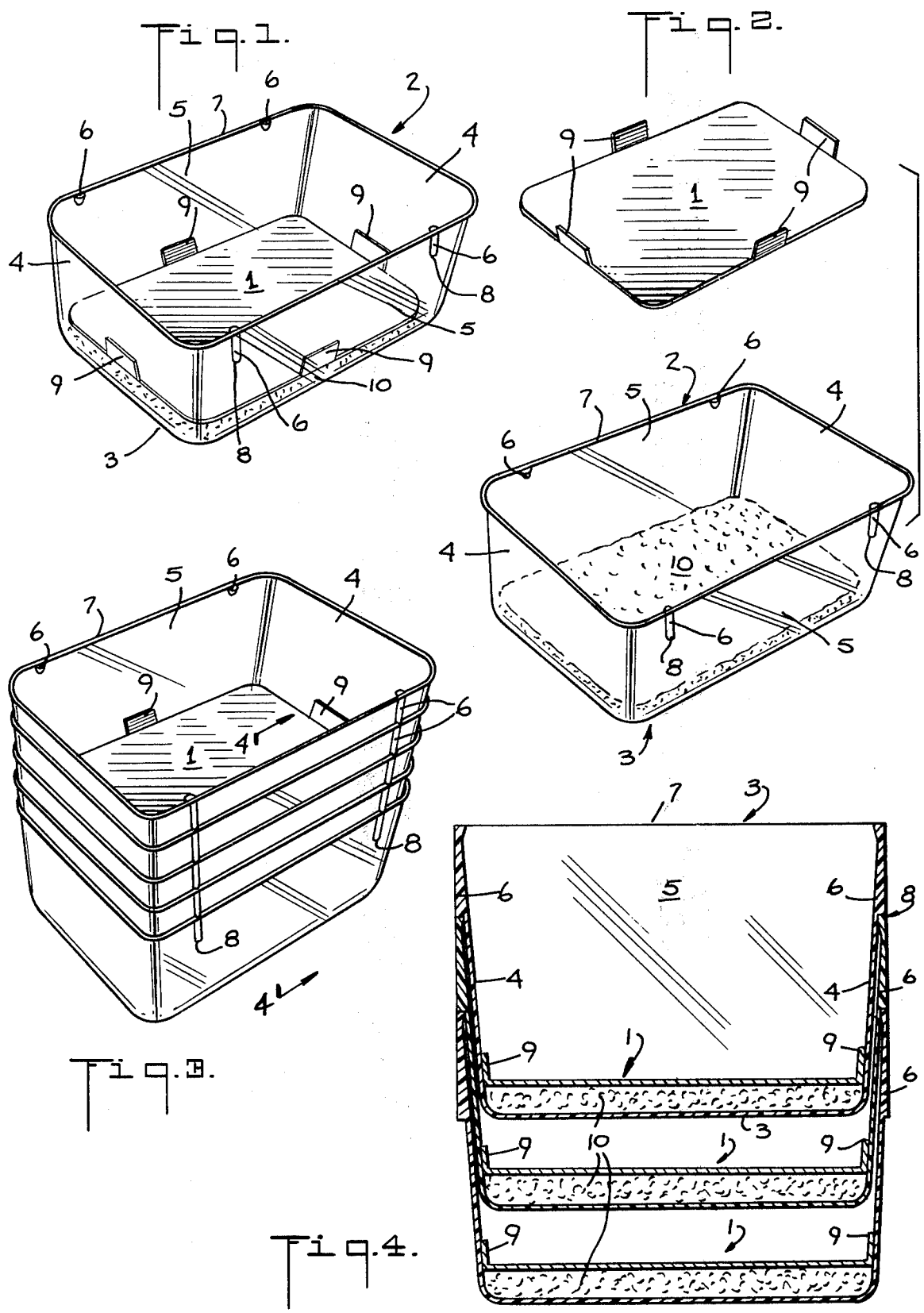

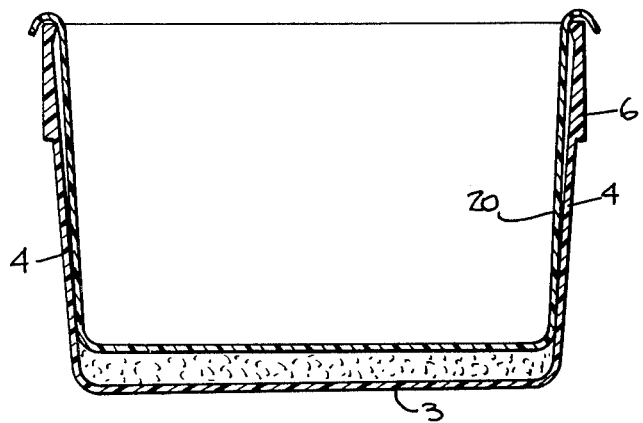
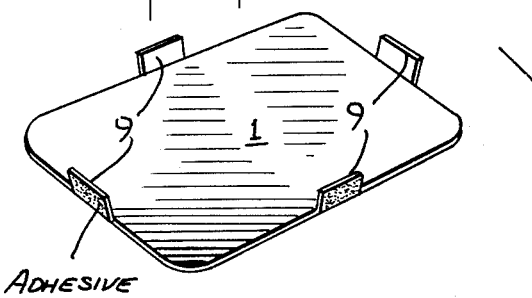
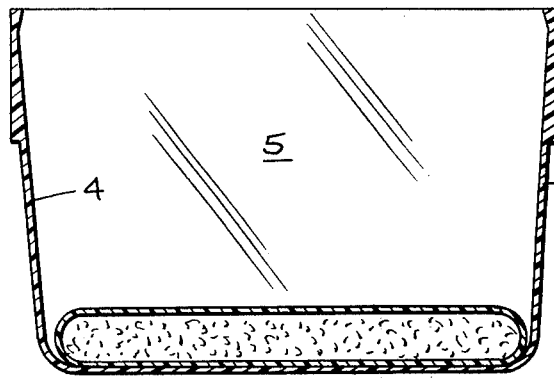
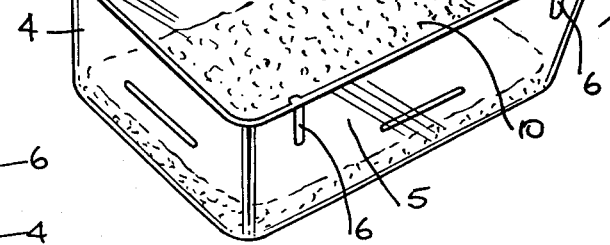
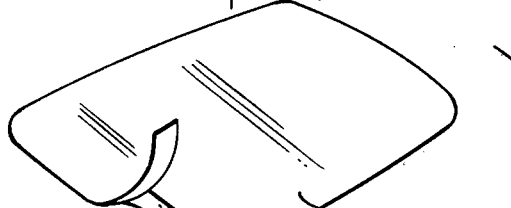
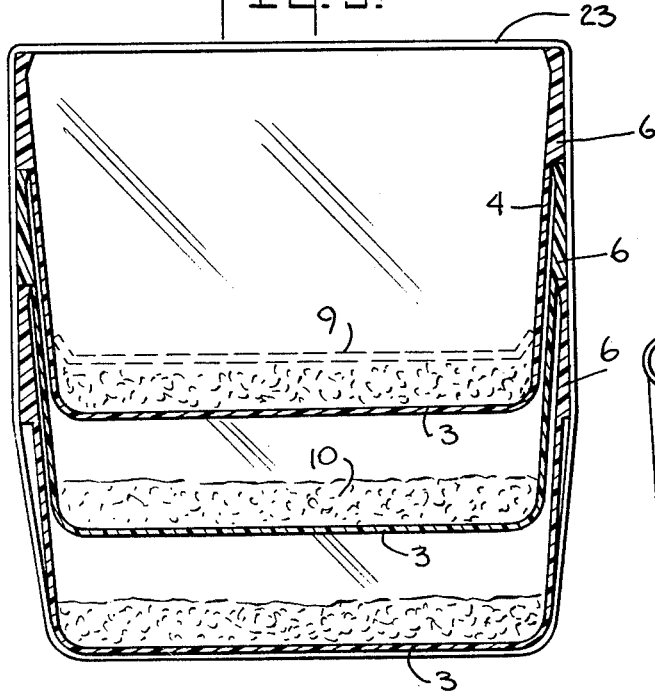
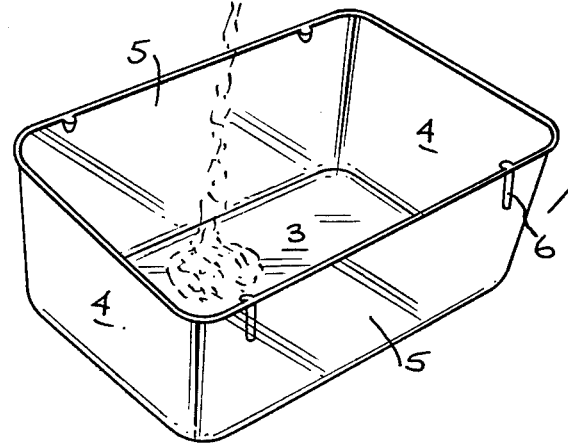

ANIMAL CAGE

This is a division of application Ser. No. 254,898 filed May 19, 1972, now U.S. Pat. No. 3,826,229.

DESCRIPTION

The present invention is directed to an animal cage and more particularly relates to an animal cage in which the bedding for the animal may be shipped with the cage itself.

Heretofore, animal cages have been supplied to laboratories by manufacturers thereof and the laboratory has deposited the bedding material for the animal into the cages as needed. When the bedding material becomes dirty, the laboratory discards the bedding material and washes the cage.

In order to do this, the cages must be made sturdy enough to resist repeated washings and the cage is necessarily out of use while it is being washed. In addition, the pouring of the bedding material in the laboratories ties up personnel and is an extra expense to the laboratory. Also, both the animal cages and the bedding material must be stored in the laboratory which increases the cost.

The present invention overcomes these problems and has for one of its objects the provision of an improved animal cage which may be shipped to the laboratories with the bedding material all ready therein.

Another object of the present invention is the provision of an improved animal cage which is disposable with the bedding material.

Another object of the present invention is the provision of an improved animal cage which need not be washed or otherwise cleaned when the bedding material becomes dirty.

Another object of the present invention is the provision of an improved animal cage in which the bedding material may be shipped together with the animal cages.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view showing the preferred embodiment of the present invention;

FIG. 2 is an exploded perspective view of the embodiment shown in FIG. 1;

FIG. 3 is a perspective view showing a number of animal cages in stacked position;

FIG. 4 is a sectional view taken along line 4—4 of FIG. 3;

FIG. 5 is an exploded view showing another embodiment of the present invention;

FIG. 6 is a sectional view showing another embodiment of the present invention;

FIG. 7 is a sectional view showing still another embodiment of the present invention;

FIG. 8 is a sectional view showing still another embodiment of the present invention; and FIG. 9 is a sectional view showing another embodiment of the present invention.

Referring more particularly to the drawings and particularly to FIG. 1, the animal cage of the present invention comprises a body 2 having a bottom wall 3 and upstanding side and end walls 4 and 5, respectively. Preferably, the body 2 is made of a transparent plastic material which is preferably of light gauge and the side and end walls 5 and 4, respectively, are integral with each other and with the bottom wall 3.

The side and end walls 4 and 5 are slightly tapered outwardly in an upward direction in order to permit the body 2 to stack with each other. Spacer members 6 are provided along the top edge 7 of the walls in order to stop downward movement of the containers when they are nestled within each other. The lower edge 8 of the stops 6 of the upper container will abut the top edge 7 of the side walls of the lower container so that the two do not lock together.

Bedding material 10 is provided to cover the bottom wall 3. The bedding material 10 may be any type of granular or particulate bedding material but any other bedding material may also be used.

In order to hold the bedding material 10 in place in the cage during shipping and storage and until the cage is to be used, a retainer member 1 is mounted within the cage until it lies close to the bedding material 10. Retaining elements, such as locking tabs or locking ears 9 extending from the retainer member 1, is provided. In the embodiment shown in FIGS. 1 to 4, the retaining ear 9 is biased outward and abuts against the side walls and end walls. In this embodiment, the cages may be stacked one on each other and the retaining element 1 keep the bedding material 10 in place during shipping and storage. When the laboratory is to use the cage, all that is necessary is for the laboratory to remove the retaining element 1 and the cage is ready to use.

In FIG. 5, another embodiment is shown in which an adhesive 11 is provided on the ears 9 of the retaining element 1 to hold the ears in place. Furthermore, although this is shown in the drawings in broken lines in FIG. 5, the inner walls of the cage may have a retaining ledge 12 under which the ears 9 would snap to hold the retaining element 1 in place.

In FIG. 6, the retaining element is in the form of a sheet 20 of material, such as a plastic material, which extends upwardly along the inner walls and is held in place by being draped over the top edges of the cage.

In FIGS. 7 and 8, bedding 10 is packaged within a tearable container 21 which can then be torn so that the bedding 10 spills into the bottom, as shown in FIG. 8.

In FIG. 9, when the cages are in stacked position, one within the other, the bottom wall 3 of an upper cage acts as the retaining element for the bedding material 10 of the next lower cage. The cages are made tight enough with respect to each other when in stacked position so that the bedding does not escape from therebetween. The uppermost cage may have a retaining element 9, as shown in dotted lines, to hold the bedding material in place or any of the other retaining means may be used. It is within the purview of the present invention that the bedding in the uppermost container would be entirely omitted or that a tight wraparound element 23 for the shipping mechanism may be used to retain the bedding in the upper container.

It will thus be seen that the present invention provides an improved animal cage which may be shipped to the laboratories with the bedding material therein and which is disposable and need not be washed when the bedding material becomes dirty.

As many and varied modifications of the subject matter of this invention will become apparent to those skilled in the art from the detailed description given hereinabove, it will be understood that the present invention is limited only as provided in the claims appended hereto.

Having thus described our invention, we claim:

1. An animal cage having a bottom wall and integral upstanding side and end walls having an upper edge, a layer of particulate bedding material on said bottom wall, a solid imperforate retaining element mounted in said cage and adjacent the bottom wall to retain the bedding material in said cage, said retaining element being in close adjacency to said bedding material, said bedding material substantially filling the entire space between the retaining element and the bottom wall, said retaining element being removably mounted within the container to expose said bedding material, means on said retaining element for holding the retaining element within the container, said means comprising spaced locking tabs extending from the retaining element and biased outwardly to bear against the walls of the cage, the distance between the retaining element and the upper edge being substantially greater than the distance between the retaining element and the bottom wall, said holding means mounted on the retaining element and having a portion thereof extending therefrom to bear against the side walls to hold the retaining element in place.

2. An animal cage as claimed in claim 1 wherein spacer means are provided on the container to prevent the containers from telescopically locking into each other.

3. An animal cage as claimed in claim 1 wherein said locking tabs extend from opposed edges of the retaining element.

4. An animal cage as claimed in claim 1 wherein said retaining locking tabs have adhesive thereon.

5. An animal cage as claimed in claim 1 wherein a retaining ledge is provided to hold the retaining element in place.

6. An animal cage as claimed in claim 1, wherein the said walls are transparent.

7. An animal cage as claimed in claim 1, wherein the bottom is on a single plane.

* * * * *